(12) United States Patent
Tanaka et al.

(10) Patent No.: US 10,006,490 B2
(45) Date of Patent: Jun. 26, 2018

(54) HALF THRUST BEARING AND BEARING DEVICE USING THE SAME

(71) Applicant: Daido Metal Company Ltd., Naka-ku, Nagoya (JP)

(72) Inventors: Shiho Tanaka, Inuyama (JP); Yoshihiro Ozawa, Inuyama (JP)

(73) Assignee: Daido Metal Company Ltd., Nagoya (JP)

( * ) Notice: Subject to any disclaimer, the term of this patent is extended or adjusted under 35 U.S.C. 154(b) by 0 days. days.

(21) Appl. No.: 15/198,386

(22) Filed: Jun. 30, 2016

(65) Prior Publication Data

US 2017/0009809 A1    Jan. 12, 2017

(30) Foreign Application Priority Data

Jul. 10, 2015    (JP) .................. 2015-138582

(51) Int. Cl.
*F16C 33/04*    (2006.01)
*F16C 33/20*    (2006.01)
(Continued)

(52) U.S. Cl.
CPC .............. *F16C 33/046* (2013.01); *F16C 9/02* (2013.01); *F16C 33/206* (2013.01); *F16C 43/02* (2013.01);
(Continued)

(58) Field of Classification Search
CPC .......... F16C 17/10; F16C 9/02; F16C 33/046; F16C 33/206; F16C 9/04; F16C 43/02;
(Continued)

(56) References Cited

U.S. PATENT DOCUMENTS

| 4,533,261 A | * | 8/1985 | Losio | ...... | F16C 17/10 384/129 |
| 4,924,523 A | * | 5/1990 | Gojon | ...... | F16C 17/10 384/273 |

(Continued)

FOREIGN PATENT DOCUMENTS

| DE | 102013203128 A1 | 8/2013 |
| EP | 2770189 | 8/2014 |

(Continued)

OTHER PUBLICATIONS

Search and Examination Report dated Nov. 30, 2016 in corresponding GB Application No. 1611771.5.

(Continued)

*Primary Examiner* — Marcus Charles
(74) *Attorney, Agent, or Firm* — Snyder, Clark, Lesch & Chung, LLP

(57) ABSTRACT

A half thrust bearing having a semicircular shape includes a thrust bearing body having a slide surface that receives an axial force from a crankshaft, and thrust reliefs formed adjacent to respective end portions of the thrust bearing body. Wall thicknesses of the thrust reliefs decrease to the respective end portions. Each thrust relief length continuously increases in a direction from an inner circumference to an outer circumference of the half thrust bearing. Each thrust relief length is a length, in a direction perpendicular to a plane that includes an end portion of the half thrust bearing, from the plane to a point at which a surface of each thrust relief intersects an inner circumference of the thrust bearing body. The half thrust bearing includes a bearing alloy layer and a resin slide layer, or additionally a back metal layer. The slide surface includes the resin slide layer.

12 Claims, 15 Drawing Sheets

(51) Int. Cl.
*F16C 17/04* (2006.01)
*F02F 7/00* (2006.01)
*F16C 9/02* (2006.01)
*F16C 17/10* (2006.01)
*F16C 43/02* (2006.01)

(52) U.S. Cl.
CPC ............. *F02F 7/0053* (2013.01); *F16C 17/10* (2013.01); *F16C 2240/46* (2013.01)

(58) Field of Classification Search
CPC .. F16C 2208/10; F16C 2240/46; F02F 7/0053
USPC ....... 384/123, 126, 275–276, 291, 294, 296, 384/420, 430, 438, 429
See application file for complete search history.

(56) References Cited

U.S. PATENT DOCUMENTS

| | | | | |
|---|---|---|---|---|
| 5,114,246 | A * | 5/1992 | Gowan | F16C 17/10 384/275 |
| 6,149,310 | A | 11/2000 | Ono et al. | |
| 6,178,843 | B1 * | 1/2001 | Machida | B62D 3/123 384/276 |
| 6,481,895 | B2 * | 11/2002 | Yang | F16C 9/02 384/123 |
| 7,134,793 | B2 * | 11/2006 | Thompson | F16C 9/02 384/123 |
| 7,258,489 | B2 * | 8/2007 | Welch | F16C 9/02 384/273 |
| 7,354,199 | B2 * | 4/2008 | Welch | F16C 9/00 384/275 |
| 8,017,668 | B2 | 9/2011 | Tanaka et al. | |
| 8,376,618 | B2 * | 2/2013 | Lehmann | F16C 9/00 384/275 |
| 8,714,825 | B2 | 5/2014 | Koushima et al. | |
| 9,016,948 | B2 * | 4/2015 | Patel | F16C 43/02 384/420 |
| 9,677,612 | B2 * | 6/2017 | Gustafson | F16C 9/02 |
| 2003/0128902 | A1 * | 7/2003 | Kennedy | F16C 9/02 384/275 |
| 2010/0260449 | A1 * | 10/2010 | Lehmann | F16C 9/00 384/456 |
| 2010/0316313 | A1 * | 12/2010 | Ishigo | F16C 9/04 384/288 |
| 2013/0343683 | A1 | 12/2013 | Sanda et al. | |

FOREIGN PATENT DOCUMENTS

| | | | | |
|---|---|---|---|---|
| GB | 2481300 | A | | 12/2011 |
| JP | 05-60124 | | | 3/1993 |
| JP | 07-238936 | | | 9/1995 |
| JP | 11-201145 | | | 7/1999 |
| JP | 2001-323928 | | | 11/2001 |
| JP | 2001323928 | A | * | 11/2001 ............. F16C 17/04 |
| JP | 2002-106551 | | | 4/2002 |
| JP | 2008-308595 | | | 12/2008 |
| JP | 4541954 | B2 | * | 9/2010 ............ F16C 33/206 |
| JP | 2013210062 | A | * | 10/2013 ............. F16C 33/12 |
| JP | 2013-238277 | | | 11/2013 |
| JP | 2014070662 | A | * | 4/2014 ............. F16C 33/30 |
| JP | 2014095431 | A | * | 5/2014 ............... F16C 9/02 |
| JP | 2016-035304 | | | 3/2016 |
| WO | WO-2009128538 | A1 | * | 10/2009 ............... F16C 9/00 |
| WO | WO-2014085584 | A1 | * | 6/2014 ............... F16C 9/02 |

OTHER PUBLICATIONS

Office Action dated Apr. 20, 2017 in corresponding JP Application No. 2015-138582.
Office Action issued in corresponding German Patent Application No. DE 102016210689.9, dated Nov. 17, 2017, 8 pages.

* cited by examiner

HALF THRUST BEARING AND BEARING DEVICE USING THE SAME

CROSS-REFERENCE TO RELATED APPLICATION

This application is based on and claims the benefit of priority from Japanese Patent Application No. 2015-138582 filed on Jul. 10, 2015. The entire disclosure of the above application is incorporated herein by reference.

BACKGROUND OF THE INVENTION

(1) Field of the Invention

The present invention relates to a thrust bearing which receives an axial force of a crankshaft of an internal combustion engine, and a bearing device using the same.

(2) Description of Related Art

The crankshaft of an internal combustion engine is rotatably supported at a cylinder block lower portion of the internal combustion engine via a main bearing, which is configured by combining a pair of half bearings into a cylindrical shape, at a journal portion of the crankshaft.

One or both of the pair of half bearings is used in combination with a half thrust bearing(s) which receives the axial force of the crankshaft. The half thrust bearing(s) is placed on one or both of end surfaces of the half bearing in the axial direction.

The half thrust bearing receives the axial force which occurs at the crankshaft. That is to say, the half thrust bearing is disposed for the purpose of supporting the axial force which is inputted to the crankshaft at the time that the crankshaft and the transmission are connected with each other by a clutch or the like.

In vicinities of circumferential ends of the half thrust bearing, thrust reliefs are formed on a slide surface side of the half thrust bearing so that the thickness of a bearing member becomes thinner toward circumferential end surfaces. In general, the thrust relief is formed so that its length from the circumferential end surface of the half thrust bearing to the slide surface and the depth at the circumferential end surface are formed to be constant irrespective of the position in the radial direction. The thrust relief is formed for absorbing positional displacement of the abutted end surfaces of the pair of half thrust bearings at the time of assembling the half thrust bearings into a split type bearing housing (see FIG. 10 in JP-A-H11-201145).

The crankshaft of an internal combustion engine is supported by the cylinder block lower portion of the internal combustion engine via a main bearing, which consists of a pair of half bearings, at a journal portion of the crankshaft. At this time, a lubricating oil is fed from an oil gallery in a cylinder block wall into a lubricating oil groove, which is formed along an inner circumferential surface of the main bearing, through a through-hole in a wall of the main bearing. The lubricating oil is supplied into the lubricating oil groove of the main bearing in this manner, and thereafter, is supplied to the half thrust bearing.

In general, a laminated structure in which an aluminum bearing alloy layer copper bearing alloy layer is formed on one surface of a steel back metal is used for bearing which receives an axial force of a crankshaft of an internal combustion there is proposed a thrust bearing improved in conformability, fatigue resistance or capacity by applying a resin slide layer on the aluminum bearing alloy layer or bearing alloy layer (see JP-A-H07-238936). As a material used for the resin slide layer, a material in which a solid lubricant is added to a resin obtained by polymer-alloying resistant resin such as polyamide imide having high strength and excellent heat polyamide or the like (see JP-A-2008-308595).

Meanwhile, in recent years, oil pumps for supplying the lubricating oil of internal combustion engines have been downsized, and therefore, the amount of the lubricating oil supplied to bearings has also decreased. Accordingly, the leakage amount of the lubricating oil from the end surfaces of the main bearing becomes decreased, and the supply amount of the lubricating oil to the half thrust bearing also tends to decrease. As the countermeasures against it, there has been provided the art of enhancing oil retainability for the lubricating oil by forming a plurality of fine grooves side by side on a slide surface of a half thrust bearing, for example (see JP-A-2001-323928). Further, it has been proposed to form an inclined surface (thrust relief) on the slide surface of the half thrust bearing from an end portion of the half thrust bearing in the circumferential direction to a substantially half of the height of a top portion, and thereby make the inclination angle of the inclined surface with respect to the slide surface gentle (see JP-A-2013-238277).

BRIEF SUMMARY OF THE INVENTION

Furthermore, in recent years, in order to reduce the weight of internal combustion engines, shaft diameters of crankshafts have been reduced, and the crankshafts have become lower in rigidity than conventional crankshafts. Therefore, deflection easily occurs in the crankshafts at the time of operation of the internal combustion engines, and vibration of the crankshafts tends to be large. Accordingly, a slide surface in the vicinities of a circumferential central portion of the half thrust bearing is brought in direct contact with a thrust collar surface of the crankshaft, and thereby damage (seizure) easily occurs.

JP-A-2001-323928 discloses a configuration which supplies a lubricating oil to the substantially entire surface of the bearing surface by providing oil grooves on the slide surface. However, even when the arts of JP-A-2001-323928 and JP-A-2013-238277 are adopted, if the vibration due to deflection of the crankshaft described above is large, it is difficult to prevent the slide surface in the vicinity of the circumferential central portion of the half thrust bearing from contacting the thrust collar of the crankshaft in particular.

Meanwhile, the lubricating oil which is supplied to the slide surface of a half thrust bearing is a lubricating oil which leaks out mainly from a crush relief clearance (clearance between a crush relief surface and a journal portion surface of a crankshaft) on a rear side of the half bearing in the rotational direction of the crankshaft. Conventionally, in a half thrust bearing, the lubricating oil which flows into the clearance on an inner diameter side (or the clearance between a thrust relief surface and a thrust collar surface) of the thrust relief on the rear side in the rotational direction of the crankshaft is only partially fed to the slide surface side, and a considerable amount of lubricating oil leaks to the outside from the clearance on an outer diameter side of the thrust relief. Therefore, supply of the lubricating oil becomes insufficient on the slide surface on the central side of the half thrust bearing in the circumferential direction, and there is the possibility of occurrence of damage on a resin slide layer constituting the slide surface of the half thrust bearing.

Therefore, an object of the present invention is to provide a half thrust bearing and a bearing device in which damage hardly occurs during operation of an internal combustion engine.

In order to achieve the above object, according to one aspect of the present invention, there is provided a half thrust bearing in a semicircular ring shape for receiving an axial force of a crankshaft of an internal combustion engine, the half thrust bearing being configured by a bearing alloy layer and a resin slide layer, or by a back metal layer, a bearing alloy layer and a resin slide layer, the resin slide layer constitute a slide surface which receives an axial force, the half thrust bearing comprising thrust reliefs formed adjacent to both circumferential end portions of a slide surface on a side which receives the above described axial force, so that a wall thickness of the half thrust bearing becomes thinner toward the circumferential end portions, wherein at least the thrust relief on a rear side in a rotational direction of the crankshaft has a thrust relief length which becomes larger toward an outer end portion from an inner end portion in a radial direction of the half thrust bearing.

Here, the crankshaft is a member including a journal portion, a crankpin portion and a crank arm portion. Further, the half thrust bearing is a member having a shape obtained by dividing a circular ring shape into substantially halves, but the halves do not intend to be halves in the strict sense.

The half thrust bearing of the present invention is a half thrust bearing in a semicircular ring shape which receives the axial force of the crankshaft of the internal combustion engine. The thrust relief on the rear side in the rotational direction of the crankshaft or both thrust reliefs is formed so that the thrust relief length at the inner end portion in the radial direction of the half thrust bearing is shorter than the thrust relief length at the outer end portion in the radial direction of the half thrust bearing. By this configuration, a large amount of lubricating oil is fed onto the slide surface near the central portion in the circumferential direction of the half thrust bearing. Therefore, even when deflection occurs in the crankshaft at the time of operation of the internal combustion engine and vibration becomes large, the slide surface of the half thrust bearing and the thrust collar surface of the crankshaft are hardly in direct contact with each other, and damage on the resin slide layer constituting the slide surface of the half thrust bearing hardly occurs.

DETAILED DESCRIPTION OF THE INVENTION

Hereinafter, embodiments of the present invention will be described with reference to the drawings.

Embodiment 1

(Entire Configuration of Bearing Device)

Figure 1:
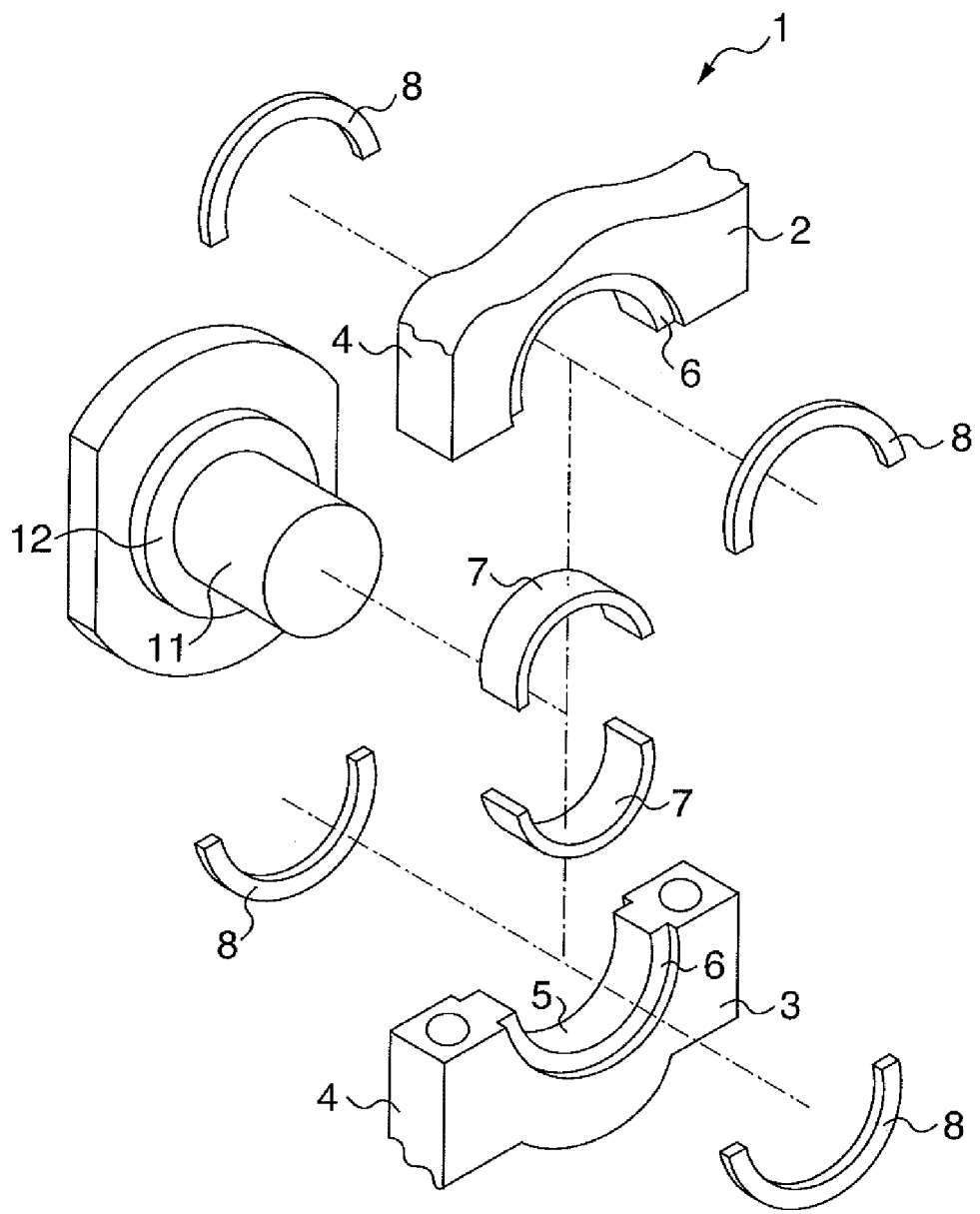
FIG. 1 is an exploded perspective view of a bearing device.
Figure 2:
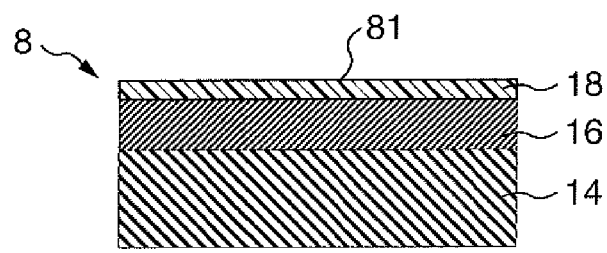
FIG. 2 is a cross sectional view of a half thrust bearing of embodiment 1.
Figure 6:
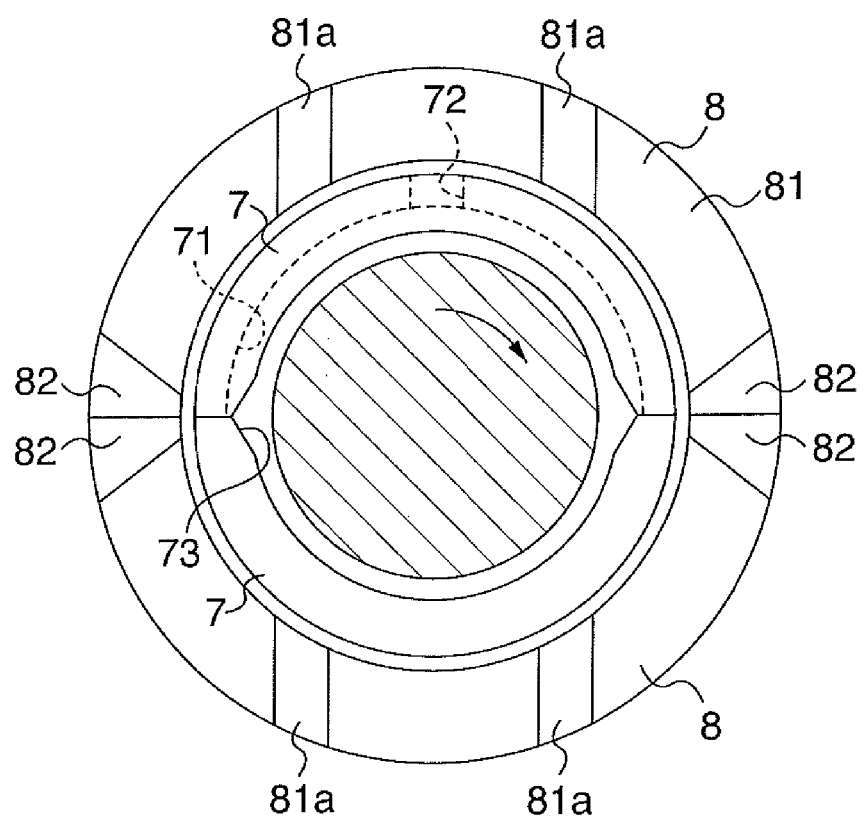
FIG. 6 is a front view of a half bearing and a thrust bearing.
Figure 7:
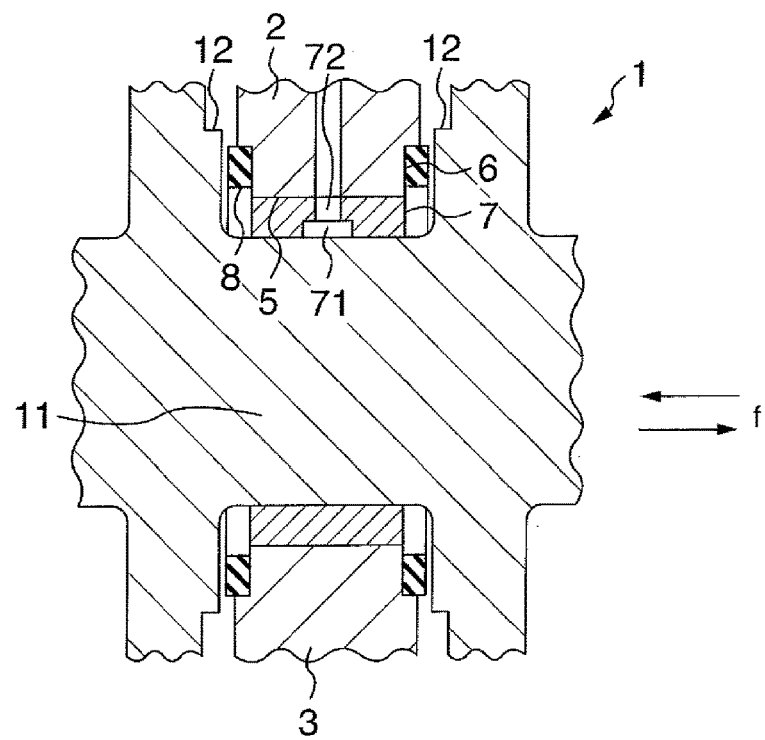
FIG. 7 is a sectional view of the bearing device.

First, an entire configuration of a bearing device 1 having a half thrust bearing 8 of the present invention will be described using FIGS. 1, 6 and 7. As shown in FIGS. 1, 6 and 7, a bearing hole (holding hole) 5 which is a circular hole penetrating between both side surfaces is formed in a bearing housing 4 which is configured by attaching a bearing cap 3 to a lower portion of a cylinder block 2, and receiving seats 6 and 6 which are concave portions in a circular ring shape are formed at a circumferential edge of the bearing hole 5 in the side surface. Half bearings 7 and 7 which rotatably support a journal portion 11 of a crankshaft are combined into a cylindrical shape and are fitted in the bearing hole 5. Half thrust bearings 8 and 8 which receive an axial force f (see FIG. 7) via a thrust collar 12 of the crankshaft are combined into a circular ring shape and are fitted in the receiving seats 6 and 6.

Figure 21:
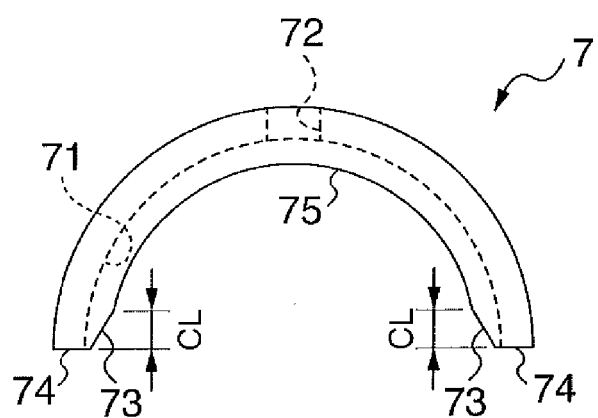
FIG. 21 is a front view of a half bearing of embodiment 5.
Figure 22:
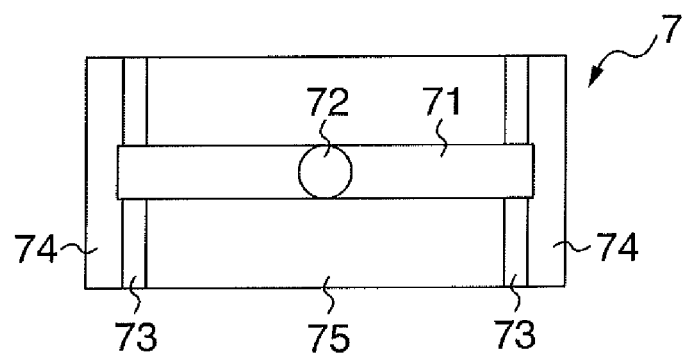
FIG. 22 is a bottom view of the half bearing seen from an inner side in a radial direction in FIG. 21.

As shown in FIG. 6, a lubricating oil groove 71 is formed on an inner circumferential surface of the half bearing 7 on a cylinder block 2 side (an upper side) of the half bearings 7 configuring the main bearing, and a through-hole 72 which penetrates to an outer circumferential surface is formed in the lubricating oil groove 71 (see FIGS. 21 and 22). Note that the lubricating oil grooves may be formed in both upper and the lower half bearings.

Further, crush reliefs 73 and 73 are formed at both circumferential end portions of the half bearing 7 adjacent to abutment surfaces of the half bearings 7 (see FIG. 6). The crush relief 73 is a wall thickness decreasing region which is formed so that a wall thickness of a region adjacent to a circumferential end surface of the half bearing 7 becomes gradually thinner toward the circumferential end surface. The crush reliefs 73 are formed for the purpose of absorbing positional displacement and deformation of abutment surfaces when the pair of half bearings 7 and 7 is assembled.
(Configuration of Half Thrust Bearing)

Next, a configuration of a half thrust bearing 8 of embodiment 1 will be described using FIGS. 2 to 5. First, the half thrust bearing 8 of the present embodiment is formed into a flat plate in a semicircular ring shape from a bimetal in which a thin bearing alloy layer 16 is bonded onto a back metal layer 14 of steel, and then a resin slide layer 18 is formed on the bearing alloy layer 16. The half thrust bearing 8 includes a slide surface 81 (bearing surface) which is configured by the resin slide layer 18 in a central region, and thrust reliefs 82 and 82 in regions adjacent to end surfaces 83 and 83 on both sides in the circumferential direction. In order to enhance retainability for lubricating oil, two oil grooves 81a and 81a are formed on the slide surface 81 between the thrust reliefs 82 and 82 on both sides.

The resin slide layer 18 is formed of a resin binder and a solid lubricant. While known resins may be used as a resin binder, it is preferable to use one or more of polyamide imide, polyimide and polybenzimidazole with high heat-resistance. Further, the resin binder may be a resin composition obtained by mixing a high heat-resistant resin consisting of one or more of polyamide imide, polyimide and polybenzimidazole and a resin of 1 to 25 vol. % consisting of one or more of polyamide, epoxy and polyether sulfone, or a resin composition obtained by polymer-alloying them. As a solid lubricant, it is possible to use molybdenum disulfide, tungsten disulfide, graphite, polytetrafluoroethylene, boron nitride or the like. The ratio of addition of the solid lubricant to the resin slide layer is preferably 20 to 80 vol. %. In order to improve wear resistance of the resin slide layer, hard particles made of a ceramic material, an intermetallic compound or the like may be contained in the ratio of 0.1 to 10 vol. % to the resin slide layer.

For forming the resin slide layer 18 on a slide surface side of the half thrust bearing 8, a composition of the resin slide layer diluted with an organic solvent is applied onto the bearing alloy layer 16 of the half thrust bearing by a spray method, the organic solvent is drayed by heating, and then the resin composition is baked by heating. However, the forming method of the resin slide layer 18 is not limited to the spray method, and the resin slide layer 18 may be formed by another common method such as a roll coat method, a print method or the like.

It will be understood that a resin slide material having the same composition as the resin slide layer may be applied not only onto the slide surface 81 receiving the axial force of the crankshaft but also onto a surface of the thrust relief 82, a surface of the oil groove 81a, an outer radial surface of the half thrust bearing, an inner radial surface thereof, and the like. For example, in embodiments 1 to 4 described below, the resin slide material is applied also onto the surfaces of the thrust reliefs 82, 82 of the half thrust bearing 8, and the surfaces of the oil grooves 81a, 81a.

The thickness of the resin slide layer 18 is 1 to 30 μm, preferably 2 to 20 μm, and more preferably 3 to 8 μm.

The thrust reliefs 82 are wall thickness decreasing regions which are formed in regions adjacent to both circumferential end surfaces on a slide surface 81 side so that wall thicknesses thereof become gradually thinner toward the end surfaces, and extend throughout an entire length in a radial direction of the circumferential end surfaces of the half thrust bearing 8. The thrust reliefs 82 are formed for easing positional displacement of the circumferential end surfaces 83 and 83 of the pair of half thrust bearings 8 and 8, that is caused by positional displacement or the like at the time of assembling the half thrust bearings 8 into the split-type bearing housing 4.

In the present embodiment, a surface of the thrust relief 82 is configured by a flat surface, but may be configured by a curved surface. The surface may be configured by a single flat surface, or may be configured by combining a plurality of flat surfaces. Further, the surface may be configured by a single curved surface, or may be configured by combining a plurality of curved surfaces. Further, the surface of the thrust relief 82 may be configured by combining a flat surface and a curved surface. Note that the above described "single curved surface" means a curved surface which is defined by a single radius of curvature.

Figure 3:
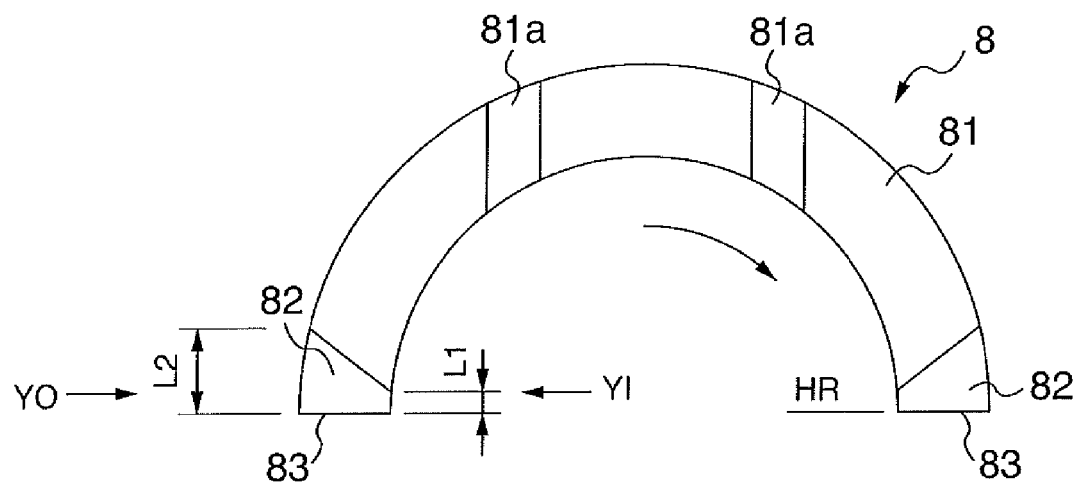
FIG. 3 is a front view of a half thrust bearing of embodiment 1.

As shown in FIG. 3, the thrust relief 82 of the present embodiment has different lengths at a radially inner end portion and a radially outer end portion of the surface of the thrust relief 82. That is to say, a thrust relief length L1 at the radially inner end portion is shorter than a thrust relief length L2 at the radially outer end portion (namely, the thrust relief 82 varies in length so that the length becomes longer toward the radially outer end portion from the radially inner end portion).

Here, the thrust relief length means a length measured in a perpendicular direction from a flat surface (half-split flat surface) passing through both end surfaces 83 of the half thrust bearing 8. In particular, the thrust relief length at the inner end portion is defined, as L1, by a length from the half-split flat surface to a point at which the surface of the thrust relief 82 intersects an inner circumferential edge of the slide surface 81. Further, the thrust relief length at the outer end portion is defined, as L2, by a length from the half flat surface to a point at which the surface of the thrust relief 82 intersects an outer circumferential edge of the slide surface 81.

Figure 4:
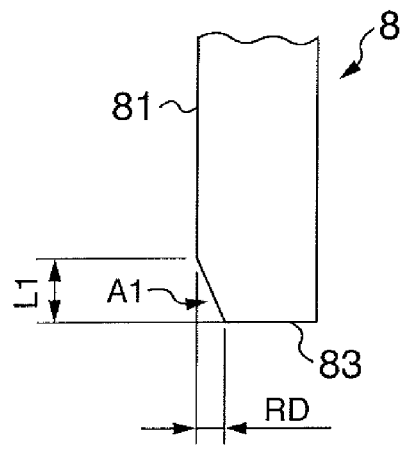
FIG. 4 is a side view of a thrust relief of the half thrust bearing seen from an arrow YI in FIG. 3.

FIG. 4 shows a side surface in the vicinity of the end portion in the circumferential direction of the half thrust bearing 8 seen from an inner side (in a direction seen from an arrow YI in FIG. 3). Similarly, FIG. 5 shows a side surface in the vicinity of the end portion in the circumferential direction of the half thrust bearing 8 seen from an outer side (in a direction seen from an arrow YO in FIG. 3).

Figure 5:
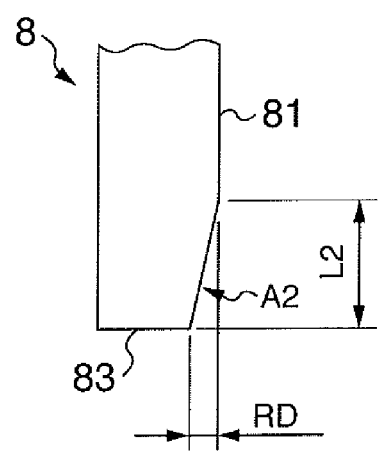
FIG. 5 is a side view of the thrust relief of the half thrust bearing seen from an arrow YO in FIG. 3.

As is understandable from FIGS. 4 and 5, the surface of the thrust relief 82 of the half thrust bearing 8 is formed to have a constant depth RD in the axial direction from the inner end portion in the radial direction to the outer end portion in the radial direction of the thrust relief 82 of the half thrust bearing 8, at the circumferential end surface 83.

Here, the depths RD means a distance in the axial direction from a flat surface including the slide surface 81 of the half thrust bearing 8 to the surface of the thrust relief 82. In other words, the depth RD is a distance which is measured perpendicularly from a virtual slide surface when the slide surface 81 is extended onto the thrust relief 82 and is set as the virtual slide surface. Accordingly, the depth RD is defined by a length from the surface of the thrust relief 82 to the slide surface 81, at the circumferential end surface 83 of the half thrust bearing 8.

Further, an axial sectional area A1 of a thrust relief clearance at the inner end portion of the half thrust bearing 8 is formed to be smaller than an axial sectional area A2 of a thrust relief clearance at the outer end portion. Here, the thrust relief clearance means a space which is surrounded by the surface of the thrust relief 82, the flat surface (the virtual slide surface) obtained by extending the slide surface 81, a flat surface (virtual end surface) obtained by extending the circumferential end surface 83, a semi-cylindrical surface which forms an inner circumferential surface of the thrust bearing 8, and a semi-cylindrical surface which forms an outer circumferential surface of the thrust bearing 8.

The axial sectional area A1 of the thrust relief clearance means an area of a region at the inner end portion of the slide surface 81 of the half thrust bearing 8 that is surrounded by the surface of the thrust relief 82, a virtual extension line formed by extending the slide surface 81 onto the thrust relief 82, and a virtual extension line formed by extending the circumferential end surface 83 of the half thrust bearing 8 to the thrust relief clearance, seen from the radial direction of the half thrust bearing 8. Similarly, the axial sectional area A2 of the thrust relief clearance means an area of a region at the outer end portion of the slide surface 81 of the half thrust bearing 8 that is surrounded by the surface of the thrust relief 82, a virtual extension line that is formed by extending the slide surface 81 onto the thrust relief 82, and a virtual extension line formed by extending the circumferential end surface 83 of the half thrust bearing 8 to the thrust relief clearance, seen from the radial direction of the half thrust bearing 8.

As specific dimensions of the thrust relief 82, the following dimensions can be adopted in the case of being used in a crankshaft (having a diameter of a journal portion of about 30 to 100 mm) of a compact internal combustion engine of a passenger car or the like, for example. That is to say, the depth RD from the slide surface 81 to the thrust relief 82 at the circumferential end surface of the half thrust bearing 8 can be set to be 0.1 mm to 1.0 mm, and can be more desirably set to be 0.15 mm to 0.5 mm. Further, the thrust relief length L1 at the inner end portion in the radial direction is set to be 0.5 mm to 15 mm, and the thrust relief length L2 at the outer end portion in the radial direction can be set to be 2.5 mm to 25 mm. More desirably, the thrust relief length L1 is 0.5 mm to 5 mm, and the thrust relief length L2 is 2.5 mm to 10 mm. Note that these dimensions are mere examples, and the dimensions are not limited to the above dimensional ranges.

The ranges of the numerical values of the thrust relief length L1 and the thrust relief length L2 described above partially overlap each other. However, this is because as the size of the bearing becomes larger, the thrust relief length needs to be larger. Accordingly, the thrust relief lengths L1 and L2 should be set so that the formula of L1<L2 is satisfied in the respective numeric value ranges.

(Operation)

Next, operation of the half thrust bearing 8 of the present embodiment will be described using FIGS. 6 and 7.

(Oil Feeding Operation)

In the bearing device 1, the lubricating oil which is pressurized and discharged from an oil pump (not illustrated) passes through the through-hole 72 which penetrates through the wall of the half bearing 7 from an internal oil path of the cylinder block 2, and is supplied to the lubricating oil groove 71 on the inner circumferential surface of the half bearing 7. A part of the lubricating oil which is supplied into the lubricating oil groove 71 is supplied to the inner circumferential surface of the half bearing 7, a part of the lubricating oil is fed to a crankpin side through an opening (not illustrated) for an internal oil path of the crankshaft that is provided on a surface of the journal portion, and the other part of the lubricating oil flows to the outside from both axial ends of the half bearings 7 and 7 through a clearance between the surfaces of the crush reliefs 73 of the pair of half bearings 7 and 7 which configure the main bearing and the surface of the journal portion 11 of the crankshaft.

In the present embodiment, the half bearing 7 is disposed coaxially with the half thrust bearing 8, and a flat surface including both circumferential end surfaces of the half bearing 7 configuring the main bearing is made in parallel with the flat surface including both circumferential end surfaces of the half thrust bearing 8, so that the positions of the crush reliefs 73 correspond to the positions of the thrust reliefs 82. Accordingly, the lubricating oil which flows to the outside from both axial ends of the main bearing (the half bearing 7) flows into clearances (thrust relief clearances) between the surfaces of the thrust reliefs 82 of the half thrust bearing 8 and the surface of the thrust collar 12 of the crankshaft.

Hereinafter, operation of the thrust relief on a rear side in a rotational direction of the crankshaft, where an operational effect of the present invention is more remarkable, will be described.

In the thrust relief 82 of the half thrust bearing 8 of the present embodiment, the thrust relief length L1 at the inner end portion in the radial direction of the thrust relief 82 is made shorter than the thrust relief length L2 at the outer end portion in the radial direction. Therefore, the lubricating oil which flows to the outside from the crush relief clearances of the half bearing 7 is restrained from flowing into the thrust relief clearances because the thrust relief length L1 is short.

In more detail, the lubricating oil in the crush relief clearance of the half bearing 7 is fed to a front side in the journal rotational direction while accompanying the journal surface, but the crush relief clearance becomes smaller in volume toward the front side in the journal rotational direction, and therefore an amount of the lubricating oil which flows to the outside from the crush relief clearance becomes large in the small volume region. Meanwhile, because the crush relief length is longer than the thrust relief length, the lubricating oil which flows out from the small volume region hardly flows into the thrust relief clearance (see FIGS. 8 and 9).

Further, according to the present invention, the sectional area A1 of the thrust relief clearance at the inner end portion of the half thrust bearing 8 is set to be small, whereby a quantitative orifice for restraining an amount of the lubricating oil which flows into the thrust relief clearance is formed. Therefore, the lubricating oil which is restrained from flowing into the thrust relief clearance mainly flows into a clearance surrounded by the thrust collar surface of the crankshaft, a seat surface of the housing, an inside diameter surface of the half thrust bearing and the journal surface of the crankshaft. The lubricating oil which flows into this clearance is fed to the front side in the circumferential direction while accompanying the rotating journal surface and the thrust collar surface, and during this while, a centrifugal force acts on the lubricating oil, whereby the lubricating oil flows into a gap between the slide surface of the half thrust bearing and the thrust collar surface from the clearance, and a large amount of lubricating oil is supplied to the slide surface 81 in the vicinity of the central portion in the circumferential direction of the half thrust bearing.

Further, according to the present invention, the thrust relief length L2 in the outer end portion of the half thrust bearing 8 is set to be comparatively long.

In general, when the circumferential end surfaces 83 of the pair of half thrust bearings 8 displace from one another in the axial direction by being assembled to the split-type bearing housing and a level difference occurs, the slide surface 81 in the regions adjacent to the thrust reliefs 82 of the half thrust bearing 8 easily contact the thrust collar surface of the crankshaft. Further, in recent years, the deflection amount of the crankshaft at the time of operation of the internal combustion engine has become large due to reduction in rigidity of the crankshaft, and therefore, the slide surface 81 in the regions adjacent to the thrust reliefs 82 of the half thrust bearing 8 more easily contacts the thrust collar, in a region of the slide surface 81 nearer to an outside diameter side end portion. However, according to the present invention, the thrust relief 82 has the thrust relief length which is larger in a region nearer to the outside diameter side end portion, and a sufficient clearance is formed. Therefore, contact of the slide surface in the region adjacent to the thrust relief 82 and the thrust collar surface hardly occurs.

By having the respective effects described above, the slide surface 81 of the half thrust bearing 8 and the crankshaft hardly contact each other.

At the time of operation of the internal combustion engine, especially under the operation condition in which the crankshaft rotates at a high speed, deflection (deflection in the axial direction) occurs in the crankshaft, and vibration of the crankshaft becomes large. By the large vibration, the axial force f toward the slide surface 81 of the half thrust bearing 8 periodically occurs in the crankshaft. The slide surface 81 of the half thrust bearing 8 receives this axial force f.

In this connection, if the thrust relief length of the half thrust bearing is simply made small along the radial direction in order to restrain inflow of the lubricating oil to the thrust relief clearance, so that the area of the thrust relief clearance at the inside diameter side of the half thrust bearing is made small, there arises the problem that the outside diameter side of the slide surface adjacent to the circumferential end portion of the half thrust bearing contacts the thrust collar surface as described above.

Further, if the thrust relief length is simply made large throughout the entire length in the radial direction as described in JP-A-2013-238277, the amount of the lubricating oil which flows into the thrust relief clearance becomes large, and therefore, supply of the lubricating oil to the slide surface near the central portion in the circumferential direction of the half thrust bearing becomes insufficient.

On the contrary, even if the axial force f of the crankshaft acts on the half thrust bearing 8 of the present invention, inflow of the lubricating oil into the thrust relief clearance at the rear side in the rotational direction of the crankshaft is restrained as described above, and therefore, a large amount of lubricating oil is fed to the slide surface 81 near the central portion in the circumferential direction of the half thrust bearing 8. By this large amount of lubricating oil, the slide surface 81 of the half thrust bearing 8 and the surface of the thrust collar 12 of the crankshaft are hardly brought into direct contact with each other.

(Effects)

Next, effects of the half thrust bearing 8 of the present embodiment will be described.

The half thrust bearing 8 of the present embodiment includes the thrust reliefs 82 and 82. The thrust relief(s) 82 on the rear side or both sides in the rotational direction of the journal portion 11 is formed so that the thrust relief length L1 at the inner end portion in the radial direction of the half thrust bearing 8 is minimum, and is shorter than the thrust relief length L2 at the outer end portion in the radial direction of the half thrust bearing 8. Therefore, the lubricating oil hardly flows into the thrust relief clearance through the relatively short thrust relief length L1 at the inner side. The lubricating oil which does not flow into the thrust relief clearance is supplied to the slide surface 81 near the circumferential central portion of the half thrust bearing 8.

Note that, as shown in FIGS. 3 and 6, the present embodiment illustrates the case where the thrust reliefs having the configuration of the present invention are formed at both circumferential end portions of the half thrust bearing 8, but the present invention is not limited to this. If the thrust relief 82 at least on the rear side in the rotational direction of the crankshaft is formed to have the configuration of the present invention, an operational effect of the present invention can be obtained.

Here, "the thrust relief on the rear side in the rotational direction of the crankshaft" means one of the thrust reliefs 82 located at both end portions, through which any point of the thrust collar 12 of the rotating crankshaft passes first, when attention is paid to the single half thrust bearing 8.

However, by forming the thrust reliefs having the configuration of the present invention at both front and the rear sides of the half thrust bearing 8 in the rotational direction of the crankshaft, there are provided such effects that the half thrust bearing 8 on the input side of the axial force f and the half thrust bearing 8 on the opposite side may have the common configuration, and erroneous assembly can be prevented.

Embodiment 2

A half thrust bearing 8A including thrust reliefs 821 of a different mode from that of embodiment 1 will be described using FIGS. 10 to 13. Note that the same or equivalent portions as or to the contents described in embodiment 1 will be explained by assigning the same reference signs thereto.

(Configuration)

First, a configuration will be described. The entire configuration of the bearing device 1 of the present embodiment is similar to that of embodiment 1. The configuration of the half thrust bearing 8A is also substantially similar to embodiment 1 except for the shapes of the thrust reliefs 821 and 821.

In the thrust relief 821 of the half thrust bearing 8A of embodiment 2, a thrust relief depth RD2 at an outer end portion in a radial direction of the thrust relief 821 is made deeper than a thrust relief depth RD1 at an inner end portion in the radial direction, at the circumferential end surface 83. Therefore, a vicinity of an outside diameter side end portion of the slide surface 81, which is adjacent to the thrust relief 821 of the half thrust bearing 8A, more hardly comes into direct contact with the thrust collar.

In the case of being used for a crankshaft (a diameter of a journal portion of about 30 to 100 mm) of a compact internal combustion engine of a passenger car or the like, the following dimensions can be adopted as specific dimensions of the thrust relief 821, for example. That is to say, the thrust relief depth RD1 at the inner end portion in the radial direction that is measured from the slide surface 81 to the thrust relief 821 at the circumferential end portion of the half thrust bearing 8A can be set to be 0.05 mm to 0.5 mm, and the thrust relief depth RD2 at the outer end portion in the radial direction can be set to be 0.3 mm to 1.0 mm. Note that these dimensions are mere examples, and the dimensions are not limited to the dimension ranges. Further, the dimensions of the thrust relief length L1 at the inner end portion, and the thrust relief length L2 at the outer end portion are the same as those described in relation to embodiment 1.

The numerical value ranges of the thrust relief depth RD1 and the thrust relief depth RD2 described above partially overlap one another. However, this is because as the size of the bearing becomes larger, the thrust relief depth needs to be larger. Accordingly, the thrust relief depths RD1 and RD2 should be set so that the formula of RD1<RD2 is satisfied in the respective numeric value ranges.

Embodiment 3

Hereinafter, a half thrust bearing 8B including thrust reliefs 822 of a different mode from embodiments 1 and 2 will be described using FIGS. 14 and 15. Note that the same or equivalent portions as or to the contents described in the above embodiments will be explained by assigning the same reference signs thereto.
(Configuration)

First, the configuration will be described. The entire configuration of the bearing device 1 of the present embodiment is similar to that of embodiment 1. The configuration of the half thrust bearing 8B is also substantially similar to the configurations of embodiments 1 and 2 except for the shapes of the thrust reliefs 822 and 822.

Figure 14:
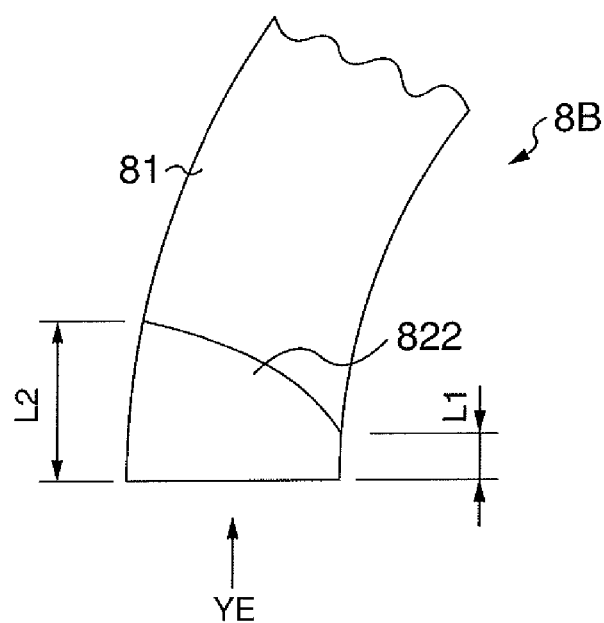
FIG. 14 is a front view of a thrust relief in embodiment 3.
Figure 15:
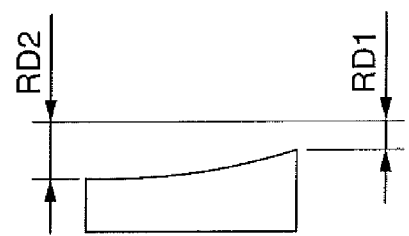
FIG. 15 is a view showing the end surface in the circumferential direction of the thrust relief seen from an arrow YE in FIG. 12.

However, the thrust relief 822 of the half thrust bearing 8B of the present embodiment is configured by a curved surface as shown in FIGS. 14 and 15. The curved surface is formed so that a thrust relief clearance is larger than that of the flat surfaces described in embodiments 1 and 2. In other words, the curved surface is recessed in a concave manner from a slide surface 81 side to an opposite surface side (a back surface side) (see FIG. 15).

Other than the above, the relationship between the thrust relief lengths L1 and L2, the relationship between the thrust relief depths RD1 and RD2, and the relationship between the sectional areas A1 and A2 of the thrust relief clearance are similar to the relationships in embodiments 1 and 2.

Note that the other configurations and operational effects of embodiment 3 are substantially similar to the configurations and operational effects of embodiments 1 and 2, and therefore explanation thereof will be omitted.

Embodiment 4

Hereinafter, a half thrust bearing 8C including thrust reliefs 823 of a different mode from embodiments 1 to 3 will be described using FIGS. 16 to 18. Note that the same or equivalent portions as or to the contents described in the above embodiments will be explained by assigning the same reference signs thereto.
(Configuration)

First, the configuration will be described. The entire configuration of the bearing device 1 of the present embodiment is similar to the entire configuration of embodiment 1. The configuration of the half thrust bearing 8C is also substantially similar to the configuration in embodiment 1 except for the shapes of the thrust reliefs 823 and 823.

Figure 16:
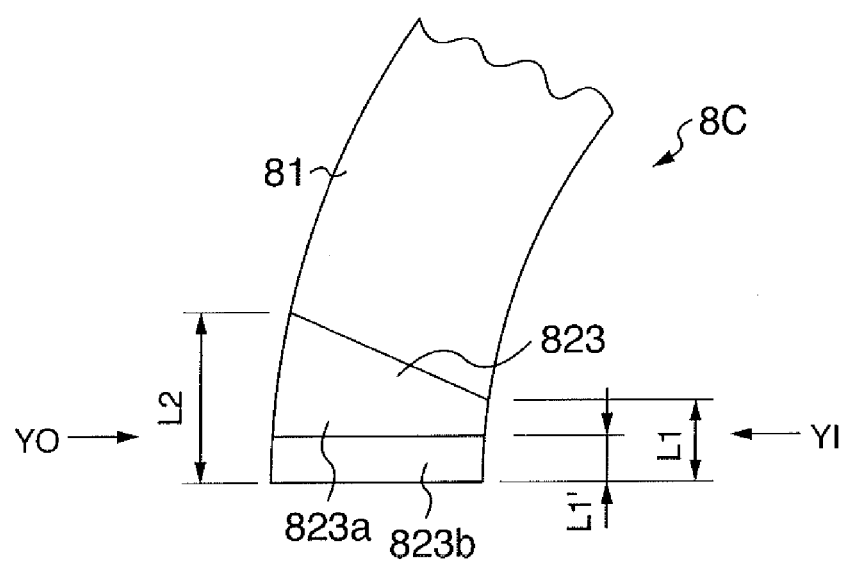
FIG. 16 is a front view of a thrust relief in embodiment 4.
Figure 17:
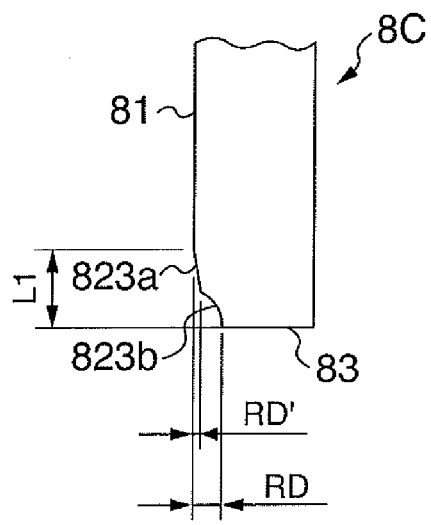
FIG. 17 is a side view of the thrust relief seen from an arrow YI in FIG. 16.
Figure 18:
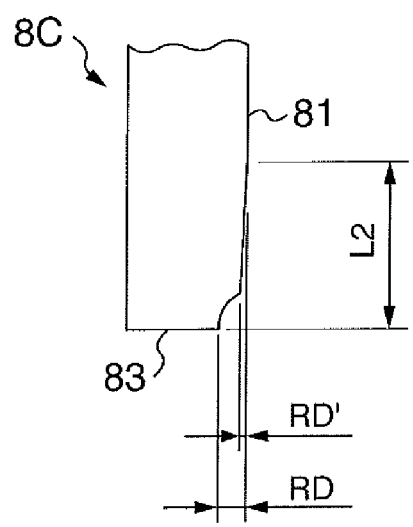
FIG. 18 is a side view of the thrust relief seen from an arrow YO in FIG. 16.

However, in the half thrust bearing 8C of the present embodiment, the thrust relief(s) 823 on the rear side or both sides in the rotational direction of the crankshaft is configured by a flat surface and a curved surface, as shown in FIGS. 16 to 18.

In the present embodiment shown in FIGS. 17 and 18, the thrust relief 823 is configured by a flat surface 823a adjacent to a slide surface side, and a curved surface 823b adjacent to the circumferential end surface 83 of the half thrust bearing. The curved surface 823b is recessed in a concave manner from a slide surface 81 side toward an opposite surface side (a back surface side).

In the present embodiment, the relationship between the thrust relief lengths L1 and L2, and the thrust relief depth RD in the circumferential end surface that is constant throughout the entire length in the radial direction are the same as those in embodiment 1.

Further, a thrust relief length L1' of a portion corresponding to the curved surface 823b (a length measured in a perpendicular direction from a flat surface including the end surface 83 of the half thrust bearing 8) is constant from an inside diameter end portion to an outside diameter end portion (see FIG. 16). The thrust relief length L1' of the curved surface portion is preferably 0.3 to 5 mm, and is more preferably 0.3 to 3 mm. Further, the relationship between the thrust relief length L1 at the inner end portion of the thrust relief 823 and the thrust relief length L1' of the portion corresponding to the curved surface 823b is set such that the thrust relief length L1' of the curved surface portion is equal to or less than 50% with respect to the thrust relief length L1, and is preferably equal to or less than 25%. In doing so, an effect of restraining inflow of the lubricating oil to the thrust relief clearance is especially enhanced.

Regarding the flat surface 823a of the thrust relief 823, a thrust relief depth RD' from the slide surface 81 at a position connecting to the curved surface 823b is constant between the inner end portion and the outer end portion of the half thrust bearing (see FIGS. 17 and 18). The thrust relief depth RD' of the flat surface 823a is preferably 0.005 to 0.2 mm, and is more preferably 0.005 to 0.1 mm.

Figure 19:
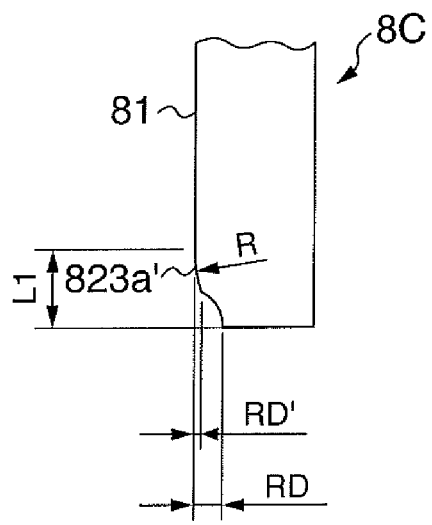
FIG. 19 is a side view of a thrust relief of another mode, corresponding to FIG. 17.
Figure 20:
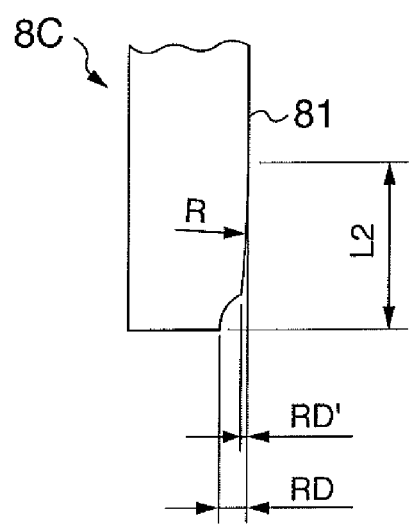
FIG. 20 is a side view of the thrust relief of the other mode, corresponding to FIG. 18.

The thrust relief length of the portion corresponding to the curved surface 823b portion is not limited to that of the present embodiment, and may be configured to become longer or shorter toward the outer end portion from the inner end portion of the half thrust bearing 8C. The portion corresponding to the flat surface 823a may be made a curved surface which is raised in a convex manner with a radius R of curvature toward the slide surface 81 side from the back surface side, as shown in FIGS. 19 and 20. Further, the thrust relief depth RD' of the flat surface 823a portion of the thrust relief 823 may be made deeper toward the outer end portion from the inner end portion of the half thrust bearing 8C.
(Operational Effect)

As shown in FIGS. 16 to 18, the surface of the thrust relief is configured by the curved surface adjacent to the circumferential end surface, and the flat surface adjacent to the slide surface. Thereby, the problem in the case where the positions of the circumferential end portions of the pair of half thrust bearings are displaced is solved by a clearance space formed by the curved surface having the sufficient thrust relief depth RD similarly to the other embodiments.

Further, in the thrust relief clearance which is formed at the inner end portion of the half thrust bearing, the axial sectional area becomes small especially in the region of the flat surface. Therefore, the sectional area A1 of the entire thrust relief clearance in the inner end portion of the half thrust bearing can be made smaller than the sectional areas in the other embodiments.

Accordingly, the half thrust bearing in embodiment 4 can effectively restrain inflow of the lubricating oil flowing out from the crush relief clearance of the half bearing into the thrust relief clearance, and is excellent in supply of the lubricating oil to the slide surface in the vicinity of the central portion in the circumferential direction of the half thrust bearing, as a result.

Note that when the flat surface 823a in FIGS. 17 and 18 is changed to a curved surface 823a' which is in a convex shape toward the slide surface side from the back surface side as shown in FIGS. 19 and 20, a similar operational effect can be provided.

Further, as described above, the thrust relief 823 can be also configured by a flat surface and a flat surface (that is, two flat surfaces). In the thrust relief 823 shown in FIGS. 16 to 18, for example, the curved surface 823b portion can be also changed to a flat surface (a flat surface formed by connecting both ends of the curved surface 823b shown in FIGS. 17 and 18 with a straight line). In this configuration, an operational effect similar to the above description can be also provided.

Note that the other configuration and operational effect of embodiment 4 are substantially similar to the configurations and operational effects of embodiments 1 to 3, and therefore explanation thereof will be omitted.

Embodiment 5

Next, the bearing device 1 including the half thrust bearing of the present invention will be described using FIGS. 3 to 7, 21 and 22. Note that the same or equivalent portions as or to the contents described in the above embodiments will be explained by assigning the same reference signs thereto.

In the present embodiment, the bearing device 1 including the half thrust bearing 8 described in embodiment 1 will be described, however, the invention is not limited thereto, and attention should be paid to the fact that even the bearing device 1 including the half thrust bearings 8A to 8C of embodiments 2 to 4 has the operational effect similar to an operational effect as follows.

As shown in FIGS. 6 and 7, the bearing device 1 of the present embodiment includes the bearing housing 4 having the cylinder block 2 and the bearing cap 3, the two half bearings 7 and 7 which rotatably support the journal portion 11 of the crankshaft, and the four half thrust bearings 8, 8, 8 and 8 which receive an axial force via the thrust collar 12 of the crankshaft.

In the cylinder block 2 and the bearing cap 3 which configure the bearing housing 4, the bearing hole 5 is formed at a joint portion thereof as a holding hole which holds the pair of half bearings 7 and 7 so as to penetrate therethrough.

The half bearing 7 includes the crush reliefs 73 and 73 at both end portions in the circumferential direction of the inner circumferential surface. Further, the half bearing 7 which is disposed on the cylinder block 2 side has the lubricating oil groove 71 which is formed along the circumferential direction in the vicinity of the center in the width direction (the axial direction), and the through-hole 72 which penetrates to the outer circumferential surface from the lubricating oil groove 71 on the inner circumferential surface side, as shown in FIGS. 21 and 22.

On both sides in the axial direction of the pair of half bearings 7 and 7, two pairs of half thrust bearings 8, 8, 8 and 8 are placed. The half thrust bearing 8 is formed into a semicircular ring shape, the outside diameter of the half bearing 7 and the outside diameter of the half thrust bearing 8 are disposed substantially coaxially, and a horizontal surface which passes through both end circumferential surfaces of the half bearing 7 and a horizontal surface HR which passes through both circumferential end surfaces of the half thrust bearing 8 are placed to be substantially parallel with each other.

Accordingly, as shown in FIG. 6, the crush relief 73 of the half bearing 7 and the thrust relief 82 of the half thrust bearing 8 are in one-to-one correspondence with each other. That is to say, the crush relief clearance of the half bearing 7 and the thrust relief clearance of the half thrust bearing 8 are located at substantially the same angle position seen in the circumferential direction.

As described in embodiment 1, in the half thrust bearing 8, the thrust relief length L1 at the inner end portion in the radial direction is made shorter than the thrust relief length L2 at the outer end portion in the radial direction. Further, the axial area A1 of the thrust relief clearance in the inner end portion is made smaller than the axial area A2 of the thrust relief clearance in the outer end portion.

The half thrust bearing 8 of the present embodiment further has the relationship with the half bearing 7 as follows, in addition to the relationship of the thrust relief length L1 and the thrust relief length L2 described above, and the relationship of the sectional area A1 and the sectional area A2.

Figure 23:
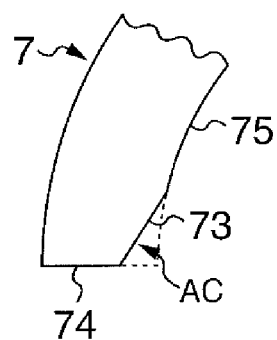
FIG. 23 is a front view of a crush relief of the half bearing of embodiment 5, seen from a front.

First, the relationship of the axial sectional area of the thrust relief clearance, and the radial sectional area of the crush relief clearance will be described using FIGS. 4 and 23. In the half thrust bearing 8 of the present embodiment, the axial sectional area A1 of the thrust relief clearance at the inner end portion in the radial direction of the thrust relief 82 is made smaller than a radial sectional area AC of the crush relief clearance of the crush relief 73 of the corresponding half bearing 7.

Here, the axial sectional area A1 of the thrust relief clearance is as described above, and the radial sectional area AC of the crush relief clearance refers to an area in a range surrounded by the surface of the crush relief 73, a virtual extension line formed by extending the slide surface 75 of the half bearing 7 onto the crush relief 73, and a horizontal line connecting the circumferential end surfaces 74 of the half bearing 7 at both the end portions thereof, at the end portion of the half bearing 7, seen from the axial direction of the half bearing 7.

Next, the relationship of lengths will be described. In the half thrust bearing 8 of the present embodiment, the thrust relief length L1 at the inner end portion in the radial direction of the thrust relief 82 is formed to be shorter than a crush relief length CL of the crush relief 73 of the corresponding half bearing 7.

Here, the crush relief length CL is the length of the crush relief 73 at the end portion in the axial direction on a side where the half thrust bearing 8 is placed, and is a height to an upper edge of the crush relief 73 from a horizontal surface at a time when the half bearing 7 is placed on the horizontal surface so that both circumferential end surfaces 74 and 74 of the half bearing 7 are made lower end surfaces (see FIG. 21). Note that, in the present embodiment, the crush relief length CL is constant throughout the axial direction, but unlike this, the crush relief length may be changed in the axial direction of the half bearing 7.

According to the configuration of the present invention, the lubricating oil which flows out from the clearance of the crush relief 73 of the half bearing 7 (an opening of the crush relief 73 at the end portion in the axial direction of the half bearing 7) hardly flows into the thrust relief clearance of the half thrust bearing 8. On the contrary, when the thrust relief length L1 is longer than the crush relief length CL, the lubricating oil which flows out from the clearance of the crush relief 73 of the half bearing 7 easily flows into the thrust relief clearance of the half thrust bearing 8.

Figure 8:
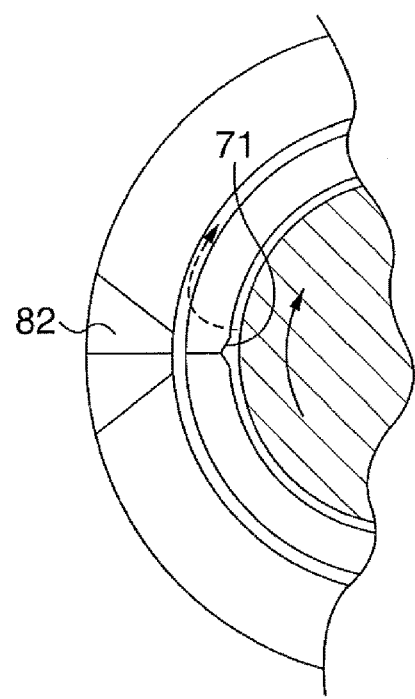
FIG. 8 is a partial front view of the bearing device for explaining operation of the present invention.
Figure 9:
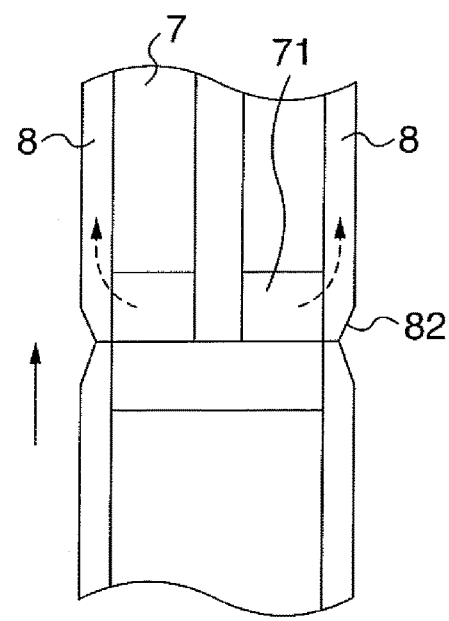
FIG. 9 is a partial front view of the half bearing and the thrust bearing seen from an inner circumferential surface side in FIG. 8, for explaining the operation of the present invention.
Figure 10:
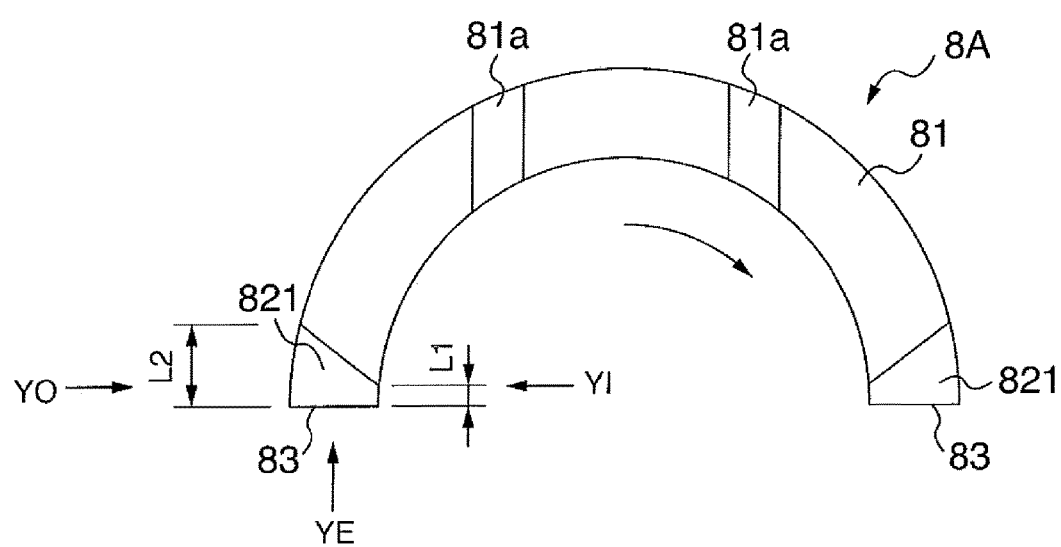
FIG. 10 is a front view of a half thrust bearing of embodiment 2.
Figure 11:
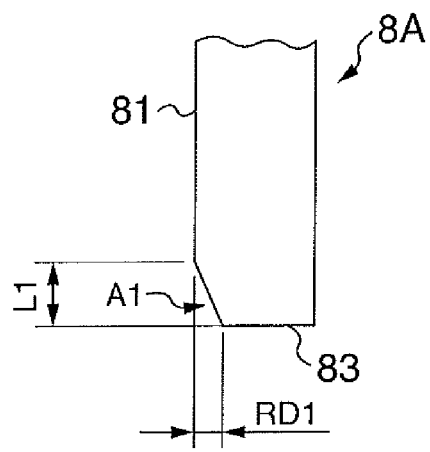
FIG. 11 is a side view of a thrust relief seen from an arrow YI in FIG. 10.
Figure 12:
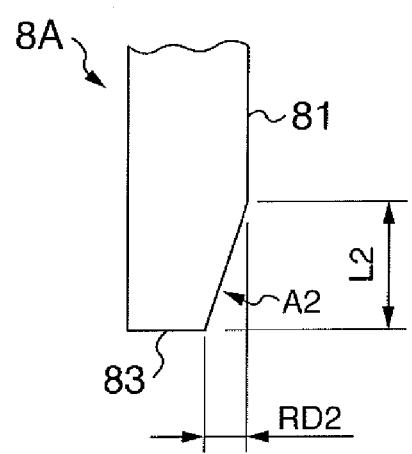
FIG. 12 is a side view of the thrust relief seen from an arrow YO in FIG. 10.
Figure 13:
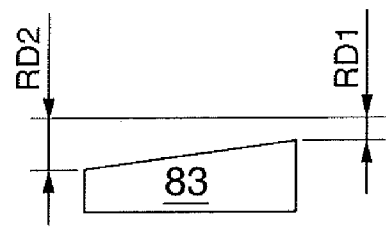
FIG. 13 is a view showing an end surface in a circumferential direction of the thrust relief seen from an arrow YE in FIG. 10.

The lubricating oil which flows out from the clearance of the crush relief of the half bearing 7 is restrained from flowing into the thrust relief clearance of the half thrust bearing 8, and therefore, flows mainly into the clearance surrounded by the thrust collar surface of the crankshaft, the seat surface of the housing, the inside diameter surface of the half thrust bearing, and the journal surface of the crankshaft (see FIGS. 8 and 9). The lubricating oil which flows into that clearance is fed to the front side in the circumferential direction while accompanying the rotating journal surface and thrust collar surface, but during this while, a centrifugal force acts on the lubricating oil, and the lubricating oil flows from that clearance into the clearance between the slide surface of the half thrust bearing and the thrust collar surface, and is supplied to the slide surface in the vicinity of the central portion in the circumferential direction of the half thrust bearing.

As above, in the bearing device 1 of the present invention, the lubricating oil which flows out from the crush relief clearance of the half bearing 7 hardly flows into the thrust relief clearance of the half thrust bearing 8 on the rear side in the rotational direction of the crank shaft. Therefore, a large amount of lubricating oil is fed to the slide surface 81 side in the vicinity of the central portion in the circumferential direction of the half thrust bearing 8. By this large amount of lubricating oil, the slide surface 81 of the half thrust bearing 8 and the surface of the thrust collar 12 of the crankshaft hardly comes into direct contact with each other.

In the case of the crankshaft (the diameter of the journal portion of about 30 to 100 mm) for a compact internal combustion engine of a passenger car or the like, a depth of the crush relief 73 at the end surface 74 that is measured from a virtual extension surface which is formed by extending the slide surface 75 onto the crush relief is 0.01 to 0.1 mm, for example, as specific dimensions of the crush relief 73 of the half bearing 7. The crush relief length CL needs to be made larger than the thrust relief length L1 at the inner end portion of the thrust relief of the half thrust bearing 8, and therefore, the crush relief length CL is desirably 1.5 times or more as large as the thrust relief length L1. The crush relief length L1 needs to be made equal to or smaller than the height in the case of the crush relief being formed in a range of a circumferential angle of 45° from the end surface in the circumferential direction of the half bearing, at the maximum.

Further, the crush relief 73 of the half bearing 7 may have chamfer which is applied to a corner edge portion at which the circumferential end surface 74 of the half bearing 7 and the crush relief 73 connect to each other. In this case, the radial sectional area AC of the crush relief clearance of the half bearing includes an area of a clearance by the chamfer.

In embodiment 5, the example in which both of the relationship of the sectional areas and the relationship of the lengths are satisfied is shown. However, in the bearing device of the present invention, only one of the relationship of the sectional areas and the relationship of the lengths may be satisfied.

For example, when a deflection amount of the shaft is large at the time of operation of the internal combustion engine, the thrust relief length needs to be made large, and therefore, the thrust relief length L1 of the inner end portion of the thrust relief sometimes becomes larger than the crush relief length CL of the half bearing 7. In the case like this, only the relationship of the sectional areas can be satisfied. However, especially in the case like this (L1>CL), use of the half thrust bearing 8C is preferable, which has the thrust relief 823 which is constituted by the flat surface 823a and the curved surface 823b as described in embodiment 4. As shown in FIG. 17, the flat surface 823a adjacent to the slide surface side of the half thrust bearing has a gentle inclination relative to the slide surface 81, and therefore enables the thrust relief length L1 at the inside diameter side to be long while restraining the area of the thrust relief clearance at the inner end portion from becoming large. Therefore, the lubricating oil which flows out from the crush relief clearance of the half bearing 7 is restrained from flowing into the thrust relief clearance.

Further, it is understandable that even when only the relationship in which the thrust relief length L1 at the inner end portion of the half thrust bearing 8 is made shorter than the crush relief length CL of the half bearing 7 is satisfied, the lubricating oil which flows out from a portion of the crush relief clearance of the half bearing 7 that is formed beyond the upper edge portion of the inner end portion of the thrust relief of the corresponding thrust bearing hardly flows into the thrust relief clearance.

Note that, as shown in FIGS. 3 and 6, in the present embodiment, there is described the case where the aforementioned relationships are established between the thrust reliefs 82 and 82 at both circumferential end portions of the half thrust bearing 8 and the crush reliefs 73 and 73 at both circumferential end portions of the half bearing 7, but the present invention is not limited to this. In the present invention, the aforementioned relationships may be established at least between the thrust relief 82 on the rear side in the rotational direction of the crankshaft and the crush relief 73 which corresponds thereto.

Further, in the present embodiment, the bearing device 1 of the type in which the half bearings 7 and the half thrust bearings 8 are separated is described, but the present invention is not limited thereto, and the present invention can be also applied to the bearing device 1 of the type in which the half bearings 7 and the half thrust bearings 8 are integrated.

Embodiments 1 to 5 of the present invention are described in detail as above with reference to the drawings, but the specific configurations are not limited to these embodiments, and the design changes to such an extent not to depart from the gist of the present invention are included in the present invention.

Figure 24:
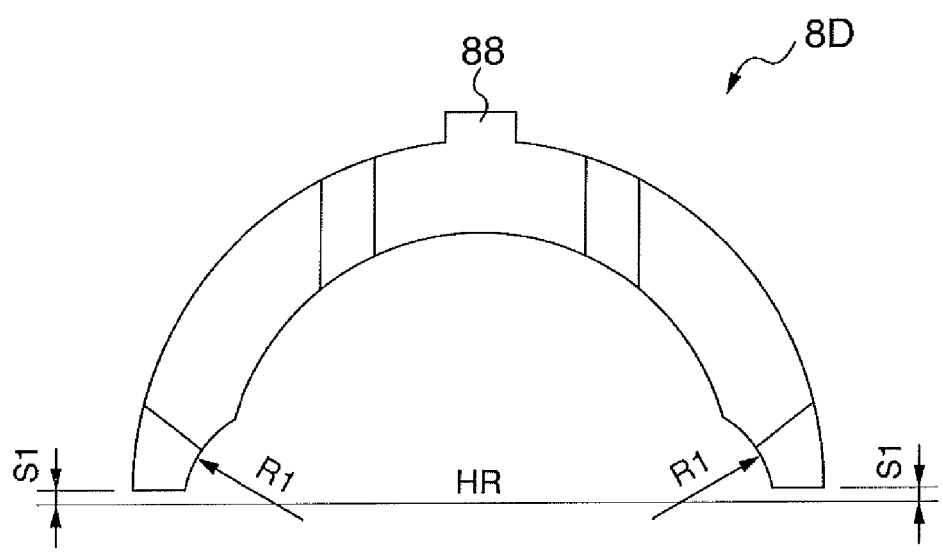
FIG. 24 is a front view of a half thrust bearing of another mode.
Figure 25:
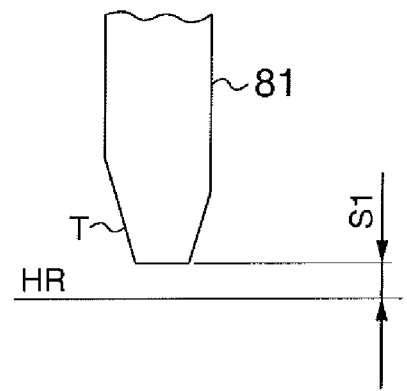
FIG. 25 is a side view of a thrust relief of the other mode.

For example, as shown in FIGS. 24 and 25, the present invention can be also applied to a half thrust bearing 8D including a protruding portion 88 which protrudes outward in a radial direction for the purpose of positioning and stopping rotation. Further, back surface reliefs can be also formed by providing tapers T at both circumferential end portions of a back surface on an opposite side from the slide surface 81 of the half thrust bearing. Further, a circumferential length of the half thrust bearing 8D can be made shorter by a predetermined length S1 than the normal half thrust bearing 8 shown in embodiment 1 and the like. Further, in the half thrust bearing 8D, an inner circumferential surface can be cut out into a circular-arc shape with a radius R1 in a vicinity of the circumferential end portion.

When the circular-arc-shaped cutout with the radius R1 is formed as above, the thrust relief lengths L1 and L2, and the thrust relief depths RD1 and RD2 of the thrust relief 82 can be expressed by lengths and depths using, as references, an extension line of the upper edge of the thrust relief 82 and an extension surface of the surface of the thrust relief 82 that are formed in the case that the circular-arc-shaped cutout is not formed.

Similarly, at the edge portion on the outer side and the edge portion on the inner side in the radial direction of the slide surface side of the half thrust bearing, chamfers may be formed throughout the circumferential direction. In that case, the thrust relief lengths and the thrust relief depths at the inner end portion and the outer end portion can be expressed by the thrust relief lengths and the thrust relief depths at the inside diameter side end portion and the outside diameter side end portion position of the half thrust bearing that are formed in the case of forming no chamfer.

Figure 26:
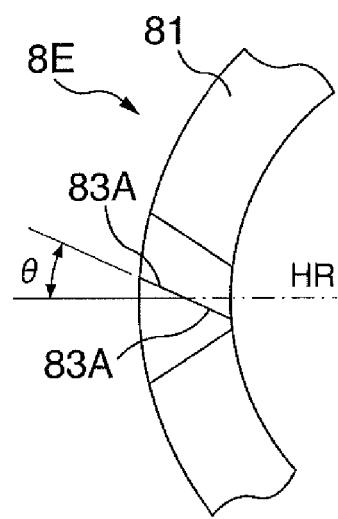
FIG. 26 is a front view showing an abutting portion of half thrust bearings of another mode.

Further, in order to prevent erroneous assembly, in only one of two abutment portions of a pair of half thrust bearings 8E, circumferential end surfaces of the respective half thrust bearings 8E are formed as inclined end surfaces 83A as shown in FIG. 26, and thereby the abutment portions of the inclined end surfaces can be formed. In this case, the inclined end surface 83A is formed by being inclined by a predetermined angle θ with respect to a flat surface (the horizontal surface HR) passing through the other circumferential end surfaces which are not inclined. Alternatively, the respective circumferential end surfaces may be formed into other shapes, such as corresponding concave and convex shapes, in place of the inclined end surfaces 83A.

However, in any case, a person skilled in the art understands that the thrust relief length L1 is defined by a length in the vertical direction from the horizontal surface HR to a point at which the surface of the thrust relief intersects the inner circumferential edge of the slide surface 81.

Figure 27:
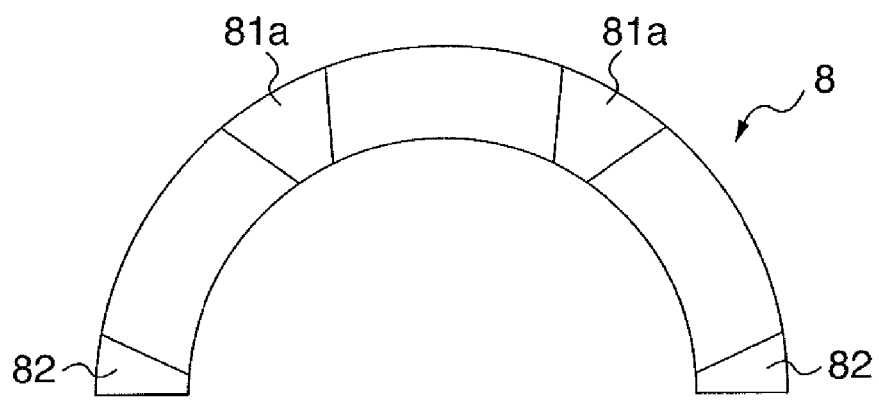
FIG. 27 is a front view of a half thrust bearing of another mode.

Further, as shown in FIG. 27, oil grooves 81a may be further formed on the slide surface 81 of the half thrust bearing 8. The oil groove 81a may be formed into the same shape as the concave portion which is formed as a pair of the thrust reliefs 82 of the present invention, in each of the abutment portions of the circumferential end portions of a pair of half thrust bearings 8 and 8. Note that, in the present embodiment, the example in which the two oil grooves 81a are formed on the slide surface is shown, but the present invention is not limited thereto, and may have one, or three or more oil grooves.

Further, in the aforementioned embodiments, the case of using four half thrust bearings in the bearing device is described, but the present invention is not limited thereto, and a desired effect can be obtained by using at least one half thrust bearing of the present invention. Further, in the bearing device of the present invention, the half thrust bearing may be formed integrally at one end surface or both end surfaces in the axial direction of the half bearing which rotatably supports the crankshaft.

Furthermore, in the above described embodiments, the half thrust bearing having the thrust reliefs at both circumferential end portions is described, but the present invention is not limited thereto. The configuration of the thrust relief according to the present invention may be adopted at the circumferential end portion of the half thrust bearing only on the rear side in the rotational direction of the crankshaft, and a thrust relief having a conventional configuration or another configuration may be formed at the end portion on the front side in the rotational direction of the crankshaft.

Still further, in the above described embodiments, the half thrust bearing consisting of the back metal layer, the bearing alloy layer and the resin slide layer is described, but the invention is not limited thereto, and may be replaced with a half thrust bearing consisting of a bearing alloy layer and a resin slide layer.

The invention claimed is:

1. A half thrust bearing in a semicircular ring shape for receiving an axial force of a crankshaft of an internal combustion engine, the half thrust bearing comprising a bearing alloy layer and a resin slide layer, or a back metal layer, a bearing alloy layer and a resin slide layer, the resin slide layer constituting a slide surface receiving the axial force, wherein
    the half thrust bearing comprises thrust reliefs formed on a side receiving the axial force and adjacent to both circumferential end portions of the half thrust bearing, so that a wall thickness of the half thrust bearing becomes thinner toward the circumferential end portions,
    each of the thrust reliefs has a thrust relief length which becomes larger continuously from an inner end portion to an outer end portion in a radial direction of the half thrust bearing, and
    the thrust relief length is a length measured from a plane including both circumferential end surfaces of the half thrust bearing to the slide surface, in a direction perpendicular to the plane.

2. The half thrust bearing according to claim 1, wherein each of the thrust reliefs has a thrust relief depth at a circumferential end surface of the half thrust bearing that becomes larger toward the outer end portion from the inner end portion in the radial direction of the half thrust bearing.

3. The half thrust bearing according to claim 2, wherein each of the thrust reliefs includes a flat surface or a curved surface.

4. The half thrust bearing according to claim 1, wherein each of the thrust reliefs includes a flat surface or a curved surface.

5. The half thrust bearing according to claim 1, wherein each of the thrust reliefs includes two flat surface portions, two curved surface portions, or a flat surface portion and a curved surface portion.

6. The half thrust bearing according to claim 1, wherein each of the thrust reliefs includes a first curved surface portion adjacent to the circumferential end surface of the half thrust bearing, and a flat surface portion adjacent to the slide surface.

7. The half thrust bearing according to claim 1, wherein each of the thrust reliefs includes a first curved surface portion adjacent to the circumferential end surface of the half thrust bearing, and a second curved surface portion adjacent to the slide surface,
    the first curved surface portion adjacent to the circumferential end surface is concave from a slide surface side toward to a surface side opposite to the slide surface side, along the radial direction, and
    the second curved surface adjacent to the slide surface is convex toward the slide surface side from the surface side opposite to the slide surface side.

8. A bearing device for a crankshaft of an internal combustion engine, comprising:
    a crankshaft of an internal combustion engine;
    a pair of half bearings which support a journal portion of the crankshaft, each half bearing comprising crush reliefs formed on its inner circumferential surface and adjacent to both circumferential end portions of the half bearing;
    a bearing housing in which a holding hole for holding the pair of half bearings is formed to penetrate through the bearing housing; and at least one half thrust bearing according to claim 1, the half thrust bearing being disposed on an axial end surface of the bearing housing, wherein each of the thrust reliefs is formed so that a sectional area of a thrust relief clearance at the inner end portion in the radial direction of the half thrust bearing is smaller than a sectional area of a crush relief clearance at a corresponding axial end portion of the half bearing.

9. The bearing device according to claim 8, wherein each of the thrust reliefs is formed so that a thrust relief length at the inner end portion in the radial direction of the half thrust bearing is longer than a crush relief length at the corresponding axial end portion of the half bearing.

10. A bearing device for a crankshaft of an internal combustion engine, comprising:

a crankshaft of an internal combustion engine;

a pair of half bearings for supporting a journal portion of the crankshaft, each half bearing comprising crush reliefs formed on its inner circumferential surface and adjacent to both circumferential end portions of the half bearing;

a bearing housing in which a holding hole for holding the pair of half bearings is formed to penetrate through the bearing housing; and at least one half thrust bearing according to claim 1, the half thrust bearing being disposed on an axial end surface of the bearing housing, wherein each of the thrust reliefs is formed so that a thrust relief length at the inner end portion in the radial direction of the half thrust bearing is longer than a crush relief length at a corresponding axial end portion of the half bearing.

11. A half thrust bearing having a semicircular shape, comprising:

a thrust bearing body having a slide surface that receives an axial force from a crankshaft associated with the half thrust bearing;

a first thrust relief formed adjacent to a first end portion of the thrust bearing body; and a second thrust relief formed adjacent to a second end portion of the thrust bearing body, wherein a first wall thickness of the first thrust relief decreases toward the first end portion, a second wall thickness of the second thrust relief decreases toward the second end portion, a first thrust relief length continuously increases in a direction from an inner circumference of the half thrust bearing to an outer circumference of the half thrust bearing, a second thrust relief length continuously increases in the direction from the inner circumference of the half thrust bearing to the outer circumference of the half thrust bearing, the first thrust relief length is a length, in a direction perpendicular to a first plane that includes a first end portion of the half thrust bearing, from the first plane to a first point at which a surface of the first thrust relief intersects an inner circumference of the thrust bearing body, and the second thrust relief length is a length, in a direction perpendicular to a second plane that includes a second end portion of the half thrust bearing, from the second plane to a second point at which a surface of the second thrust relief intersects the inner circumference of the half thrust bearing, and wherein the half thrust bearing includes a bearing alloy layer and a resin slide layer, and the slide surface includes the resin slide layer.

12. The half thrust bearing of claim 11, wherein the half thrust bearing further includes a back metal layer.

\* \* \* \* \*